Dec. 31, 1935.  H. K. WHEELOCK  2,026,111
AIR BAG
Filed Oct. 15, 1934
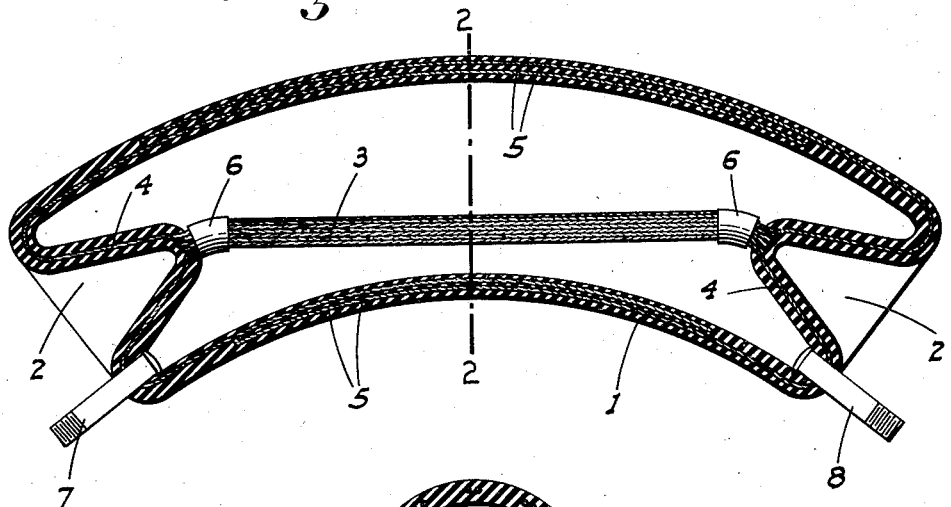
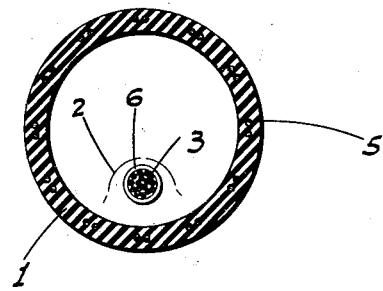
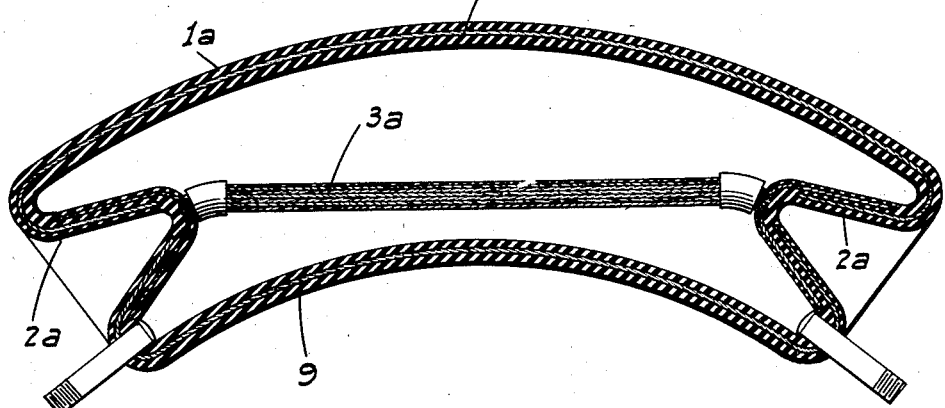
INVENTOR
H. K. Wheelock
BY
ATTORNEY Patented Dec. 31, 1935

2,026,111

UNITED STATES PATENT OFFICE 2,026,111

AIR BAG

Herbert K. Wheelock, Los Angeles, Calif.

Application October 15, 1934, Serial No. 748,327

10 Claims. (Cl. 18—45)

This invention relates to the tire repairing industry and particularly to a sectional air bag adapted for insertion into a tire casing when a patch is being cured therein in a sectional mold. Some difficulty has heretofore been encountered in getting these bags into the tire properly when the tires are placed in these sectional molds, and also it has been difficult to prevent the bags from unduly stretching out at their ends when internal pressure is applied to the bag, and which tends to cause the tire engaging portion of the bag to be pulled away from the same.

Various devices have been provided in an attempt to overcome these conditions, but as far as I am aware all such devices are open to some objection. The principal object of my invention is to provide a bag of the above character so constructed that it may be readily collapsed when deflated so that its insertion in and removal from a tire is a simple and easy matter, and yet so that when the bag is inflated its ends are positively prevented from moving apart, so that the circumferentially extending or tire engaging portion of the bag expands evenly throughout its length against the interior walls of the tire as is desirable. Also, the bag as a whole is prevented from stretching lengthwise without any interference being had with its radial expansion under pressure.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a sectional elevation of my improved bag showing one arrangement of the end connecting cords therein.

Figure 2 is a cross section on the line 2—2 of Figure 1.

Figure 3 is a sectional elevation of a bag showing a modified arrangement of the cords.

Referring now more particularly to the characters of reference on the drawing, and particularly at present to Figures 1 and 2, the bag 1 is a one-piece member of relatively soft expansible and collapsible rubber such as is commonly used for air bags and tubes, and which is shaped to fit the interior of the particular sized tire for which it is intended. The ends of the bag are formed with circumferentially cone-shaped sockets 2, the rubber of the bag being molded to provide such sockets without distortion or deformation of the bag itself; the walls of the socket rounding into the circumferential portion of the bag at the ends as shown.

A plurality of independent normally taut cords 3 arranged in bundle form extend straight across between the inner adjacent ends of the sockets 2, the cords entering and being vulcanized in the rubber. The cords then spread radially so as to extend along the walls of the sockets as shown at 4 and then along the circumferential portion of the bag as shown at 5. The cords from the opposite ends of the bundle preferably overlap each other for a considerable distance along said circumferential portion of the bag, as shown, so that they are firmly tied in place by the rubber and of course also serve to prevent longitudinal stretching of the latter.

The possibility of the sockets pulling away from the cords when the bag is inflated is therefore eliminated while at the same time the cords are capable of flexing in any direction. To prevent the cords from possibly ravelling under pressure the bundle is preferably bound adjacent the points where the cords enter the sockets. The binders used may be metal bands, as shown at 6, or any other suitable means.

The bag at the ends is provided with an inlet fitting 7 for air, steam or other pressure medium; and if a circulating of this medium is desired an outlet fitting 8 is also mounted in the bag at the opposite end of the same.

Due to the provision of the cone-shaped end sockets 2, the bag may be collapsed into a much smaller size than is ordinarily the case and this permits an easier insertion of the bag into the tire. Then when inflation occurs within the bag the ends of the sockets are held from moving apart by the cords, and the side walls of the sockets rounding as they do into the outer walls of the bag, permit the bag to expand radially in all directions under the pressure but without any undue strain coming on the ends of the bag. The cords not only prevent outward or separating movement of the end sockets but also prevent stretching and lengthening of the bag itself without interfering with the radial expansion thereof and which is of course necessary to cause it to properly press against the inner wall of the tire and the patch being cured therein. I have thus provided a bag which can be easily inserted in the tire, and which when inflated will expand outwardly in all directions except at the ends.

It will be obvious that the important feature of the invention is the folding in of the ends of the bag to form the sockets 2 which gives a folded in double wall effect to the bag at such ends. By predetermination of the length of these folded in ends the initial cross sectional diameter of the bag may be held within those limits which will allow of the bag being readily inserted into a given tire. At the same time this double walled end feature will allow of a radial multiple expansion of the bag in addition to the normal expansion of which the ordinary elastic air bag is capable. As the double walls unfold under pressure the limits of this additional expansion will depend on the length of the sockets as will be obvious. In some extreme instances tires have a rim diameter of only ten inches while the carcass itself has a twenty inch cross sectional diameter. An air bag to be useful under these conditions must therefore be capable of expanding to and beyond this twenty inch diameter and yet must be small enough to be inserted through the ten inch rim opening. A bag not having my described multiple expansion characteristic would therefore have to be of such an initial cross sectional diameter that it would be substantially impossible to insert it in the tire. With a bag of my novel construction however this trouble is avoided. The bag may be readily inserted into the tire. The unfolding of the double end walls under pressure, with the ends held against longitudinal movement, permits such a predetermined multiple expansion of the bag as is found necessary to fill the tire area with the bag to cause it to effectually perform its functions.

The construction in Figure 3 is the same as above described except that the cords 3a of the central bundle terminate in the side walls of the sockets 2a of the bag 1a. Additional cords 9 extend along the circumferential walls of the bag and into the walls of the sockets, terminating at their ends in overlapping relation to the ends of the cords 3a.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A sectional repair bag comprising a hollow air-tight body of flexible material shaped to fit and follow the interior contour of a tire, said body at its ends being depressed inwardly to form integral cone shaped sockets, whereby the body may collapse at its ends, and means extending directly between and connecting the body material at the bottom of the sockets to prevent internal pressure within the bag from pushing the socket portions outwardly.

2. A sectional repair bag comprising a hollow air-tight body of flexible material shaped to fit and follow the interior contour of a tire, and a plurality of separate cords embedded at their ends in the material of the body and extending in adjacent relationship straight between the end portions of the body and centrally of the area thereof.

3. A structure as in claim 2, with means binding the cords together in bundle form adjacent the ends of the bag.

4. A sectional repair bag comprising a hollow air-tight body of flexible material shaped to fit and follow the interior contour of a tire, and a plurality of separate cords arranged in bundle form extending straight between the end portions of the bag centrally of their area; the ends of said cords extending into the body material at the ends thereof and then along the circumferentially extending portion thereof in overlapping relation to each other.

5. A structure as in claim 2 including collars surrounding and binding the cords together in bundle form adjacent the ends of the bag.

6. A sectional repair bag comprising a hollow air-tight body of flexible material shaped to fit and follow the interior contour of a tire, and having closed ends, said ends being depressed inwardly to form integral cone shaped sockets, and a plurality of separate cords embedded at their ends in opposite ends of the bag at the apex of the cone shaped sockets and extending between said sockets lengthwise and interiorly of the bag.

7. A device as in claim 6 wherein the separate cords extending between the ends of the bag are secured together as a single unitary cord.

8. A sectional repair bag comprising a hollow air-tight body of flexible material shaped to fit and follow the interior contour of a tire, and a plurality of separate cords imbedded at their ends in the end portions of the bag from interiorly thereof and extending centrally and lengthwise of the bag between said end portions in the form of a relatively large unitary cord.

9. A sectional repair bag comprising a hollow air-tight body of flexible material shaped to fit and follow the interior contour of a tire, and a plurality of separate cords arranged in bundle form extending straight between the end portions of the bag centrally of their area, the ends of said cords extending into the body material at the ends thereof, and then along the circumferentially extending portion thereof.

10. A sectional repair bag comprising a hollow air-tight body of flexible material shaped to fit and follow the interior contour of a tire, and a plurality of separate cords arranged in bundle form extending straight between the end portions of the bag centrally of their area, and separate cords extending individually in the body material from one end of the bag to the other; the ends of said last named cords overlapping the ends of said first named cords within the ends of the bag.

HERBERT K. WHEELOCK.